(12) United States Patent
May

(10) Patent No.: US 6,977,447 B2
(45) Date of Patent: Dec. 20, 2005

(54) METHOD AND APPARATUS FOR REGULATING MULTIPLE OUTPUTS OF A SINGLE INDUCTOR DC TO DC CONVERTER

(75) Inventor: Marcus W May, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 541 days.

(21) Appl. No.: 10/207,450

(22) Filed: Jul. 29, 2002

(65) Prior Publication Data

US 2004/0017111 A1   Jan. 29, 2004

(51) Int. Cl.[7] .............................................. H02J 1/00
(52) U.S. Cl. ....................................... 307/31; 323/282
(58) Field of Search ........................ 307/31; 323/282, 323/284, 351, 271, 222, 225

(56) References Cited

U.S. PATENT DOCUMENTS 5,272,614 A * 12/1993 Brunk et al. ............. 363/21.05
6,204,651 B1 * 3/2001 Marcus et al. .............. 323/283
2002/0060559 A1 * 5/2002 Umemoto .................... 323/282
2002/0093320 A1 * 7/2002 Van Auken .................. 323/282

* cited by examiner

Primary Examiner—Brian Sircus
Assistant Examiner—Brett Squires
(74) Attorney, Agent, or Firm—Garlick, Harrison & Markison LLP; Timothy W. Markison

(57) ABSTRACT

A method and apparatus for regulating multiple outputs of a single inductor DC to DC converter includes processing that begins by producing a regulation signal to regulate a $1^{st}$ output of the multiple outputs based on at least one of the multiple outputs. The processing then continues by identifying one of the multiple outputs to receive energy from the inductor during at least one cycle of the regulation signal. The processing continues by scaling the regulation signal for the at least one cycle based on the voltage of the particular output to receive the energy, the voltage of the $1^{st}$ output and the supply voltage to the DC to DC converter when the particular output to receive the energy is not the $1^{st}$ output. In this manner, when the output receiving the energy is not the $1^{st}$ output (i.e., the directly regulated output), the regulation signal is scaled based on the desired duty cycle for the particular output.

20 Claims, 6 Drawing Sheets

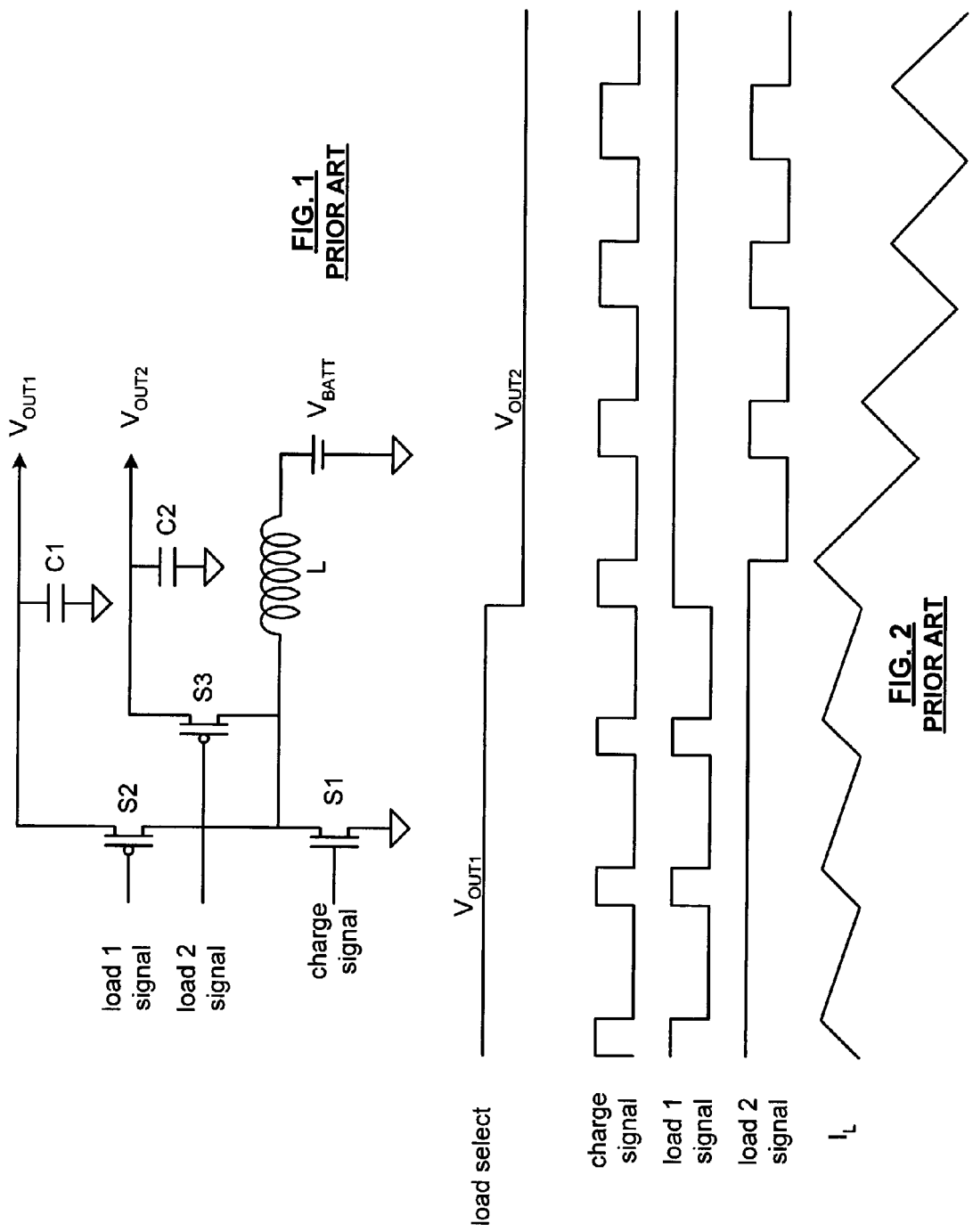

DC-DC converter 22

DC-DC converter 22

METHOD AND APPARATUS FOR REGULATING MULTIPLE OUTPUTS OF A SINGLE INDUCTOR DC TO DC CONVERTER

TECHNICAL FIELD OF THE INVENTION

This invention relates generally to power supplies and, in particular, to integrated circuit DC to DC converters.

BACKGROUND OF THE INVENTION

As is known, all electronic devices that include integrated circuits require at least one DC voltage supply and typically requires multiple DC voltage supplies. A DC voltage supply may be generated from an AC voltage source (e.g., 110 volts AC) or from another DC voltage supply (e.g., a battery). To generate a DC voltage supply from an AC voltage, the AC voltage is processed in a controlled manner. For example, a switch-mode power supply will rectify the AC voltage to produce a DC bridge voltage. Using one of a plurality of switch mode converter topologies (e.g., full bridge, half bridge, buck, or boost) an inductor is charged and discharged at a controlled rate to produce a regulated DC voltage supply.

When only one DC output voltage is needed, a well-regulated power supply system is readily achievable. When multiple DC output voltages, or supplies, are needed, however, design choices must be made to optimize the performance of the multiple output power supply. If power consumption is not a significant issue, but well-regulated multiple DC output is, then linear regulators may be used for the auxiliary outputs and direct regulation of the primary DC output supply. While the linear regulator will accurately produce the three-volt output from a five-volt source, it is inefficient since that for every three watts of output power produced, two watts are consumed.

In an alternate design choice, if power consumption is a critical factor, but regulation of auxiliary supplies, (e.g., the three volts in the preceding example) is not a critical factor, then a multi-tap transformer may be used in place of the inductor. A secondary tap on the transformer produces the auxiliary DC output and a primary tap produces the primary DC output. In this embodiment, only the primary output is regulated. Thus, as the load varies on the primary DC output, the auxiliary DC output will vary by as much as ten percent (10%).

In designs where both power consumption and well-regulated multiple outputs are significant factors, DC to DC converters are used. As is known, a DC to DC converter includes its own inductor and control circuit to regulate a DC output from a DC input. Thus, multiple inductors and multiple control circuits are needed. As with most electrical devices, size and cost are concerns. Thus, having multiple DC to DC converters to produce regulated power supply voltages is prohibitive to reducing size and reducing costs of such devices, especially when at least partially implemented on an integrated circuit.

Recent advances in DC to DC converter design have produced multiple outputs from a single inductor. FIG. 1 illustrates an embodiment of the transistor switching circuitry of a boost converter producing two outputs from a single inductor. As shown, this portion of the boost converter includes three switching transistors (S1, S2 and S3), an inductor (L), a battery ($V_{batt}$) and two capacitors (C1 and C2). The boost converter produces two outputs ($V_{out1}$ and $V_{out2}$). In operation, a charge signal turns on transistor (S1) such that a current flows through the inductor (L) to charge it, i.e. builds electromagnetic energy within the inductor. When the charge signal is removed, turning transistor S1 off, either load signal 1 or load signal 2 is activated turning on the corresponding transistors S2 or S3. For instance, if load signal 1 is activated, S2 is enabled such that at least some of the energy built-up in inductor L is transferred to capacitor C1 thereby producing output voltage $V_{out1}$. Similarly, when load 2 signal is activated, the energy from the inductor is provided to capacitor C2 thereby producing output $V_{out2}$.

An issue with the boost converter of FIG. 1 is that unwanted output voltage ripple is generated when switching between the loads (i.e., switching between enabling load 1 signal and load 2 signal). FIG. 2 depicts an illustrative example of the ripple. FIG. 2 illustrates a load select signal, the charge signal, load 1 signal, load 2 signal and the inductor current. The load select signal indicates whether load 1 signal will be activated (i.e., signal is in the high state) or whether load 2 signal (i.e., the signal is in the low state) will be activated. As shown, initially the load select is selecting the $1^{st}$ output ($V_{out1}$) such that load 1 signal will be activated.

When the charge signal is high, transistor S1 is on such that current is flowing through the inductor from the battery to ground via S1. As shown, the current rises during the activation of the charge signal. When the charge signal is disabled and load signal 1 is enabled, at least some of the energy is transferred from the inductor to capacitor C1 via S2. During this time, the inductor current decreases as shown. The ratio between the on-time of the charge signal and the on-time of load 1 signal is dependent on the output voltage $V_{out1}$ and the battery voltage $V_{batt}$, in a steady state condition.

The charging and discharging of the inductor and capacitor C1 continues in the manner as previously described while load select signal remains in the high state. When the load select signal transitioned to the low state such that C2 will receive the energy from the inductor, the control circuitry (not shown in FIG. 1) begins to adjust the loop response accordingly. For this example, the control circuitry begins to increase the duty cycle of the charge signal, since $V_{out2}$ is greater than $V_{out1}$. As shown, at the transition of the load select signal, the charge signal has minimal pulse width change, with respect to the duty cycle for $V_{out1}$, due to the relatively slow loop response of the control circuitry with respect to the switching frequency. As such, the charge signal causes the inductor current to increase almost as if it were being charged for the first output $V_{out1}$. When the charge signal is disabled and load 2 signal is enabled, the current of the inductor decreases substantially in comparison to the decease for load 1. As the control loop continues to adjust for providing energy to capacitor C2 for $V_{out2}$ the charge signal continues to increase in pulse width thereby increasing the "charge" current for the inductor. At some point in time, a steady state condition will be reached for regulating the $2^{nd}$ output $V_{out2}$. However, during the transition time, as illustrated, the inductor current is offset from a DC average. This offset is directly reflected in the output voltage $V_{out2}$ as ripple. Such output ripple in some integrated circuit applications is unacceptable.

Therefore, a need exists for a method and apparatus of regulating multiple outputs of a single inductor DC to DC converter with reduced output ripple.

BRIEF DESCRIPTION OF THE DRAWINGS

FIG. 1 illustrates a schematic block diagram of a single inductor boost converter of the prior art;

FIG. 2 illustrates a graphical representation of the operation of the boost converter of FIG. 1;

DETAIL DESCRIPTION OF A PREFERRED EMBODIMENT

Generally, the present invention provides a method and apparatus for regulating multiple outputs of a single inductor DC to DC converter. Such a method and apparatus includes processing that begins by producing a regulation signal to regulate a $1^{st}$ output of the multiple outputs based on at least one of the multiple outputs. As such, one of the multiple outputs is selected to be the primarily regulated output wherein the regulation of the selected output is based on the voltage of the selected output and/or based on the voltages of the other outputs. The processing then continues by identifying one of the multiple outputs to receive energy from the inductor during at least one cycle of the regulation signal. For instance, each of the multiple outputs will eventually receive energy from the inductor to maintain its desired voltage. This inquiry is determining for at least the current cycle of the regulation signal, which of the multiple outputs is to receive the energy from the inductor. The processing continues by scaling the regulation signal for the at least one cycle based on the voltage of the particular output to receive the energy, the voltage of the $1^{st}$ output and the supply voltage to the DC to DC converter when the particular output to receive the energy is not the $1^{st}$ output. In this manner, when the output receiving the energy is not the $1^{st}$ output (i.e., the directly regulated output), the regulation signal is scaled based on the desired duty cycle for the particular output. As such, by scaling the charge signal based on an output's steady state duty cycle, the slow loop response of the control circuitry of prior art DC to DC converters is overcome and thus the unwanted ripple induced by the transition from load to load as illustrated in FIG. 2 is substantially eliminated.

Figure 3:
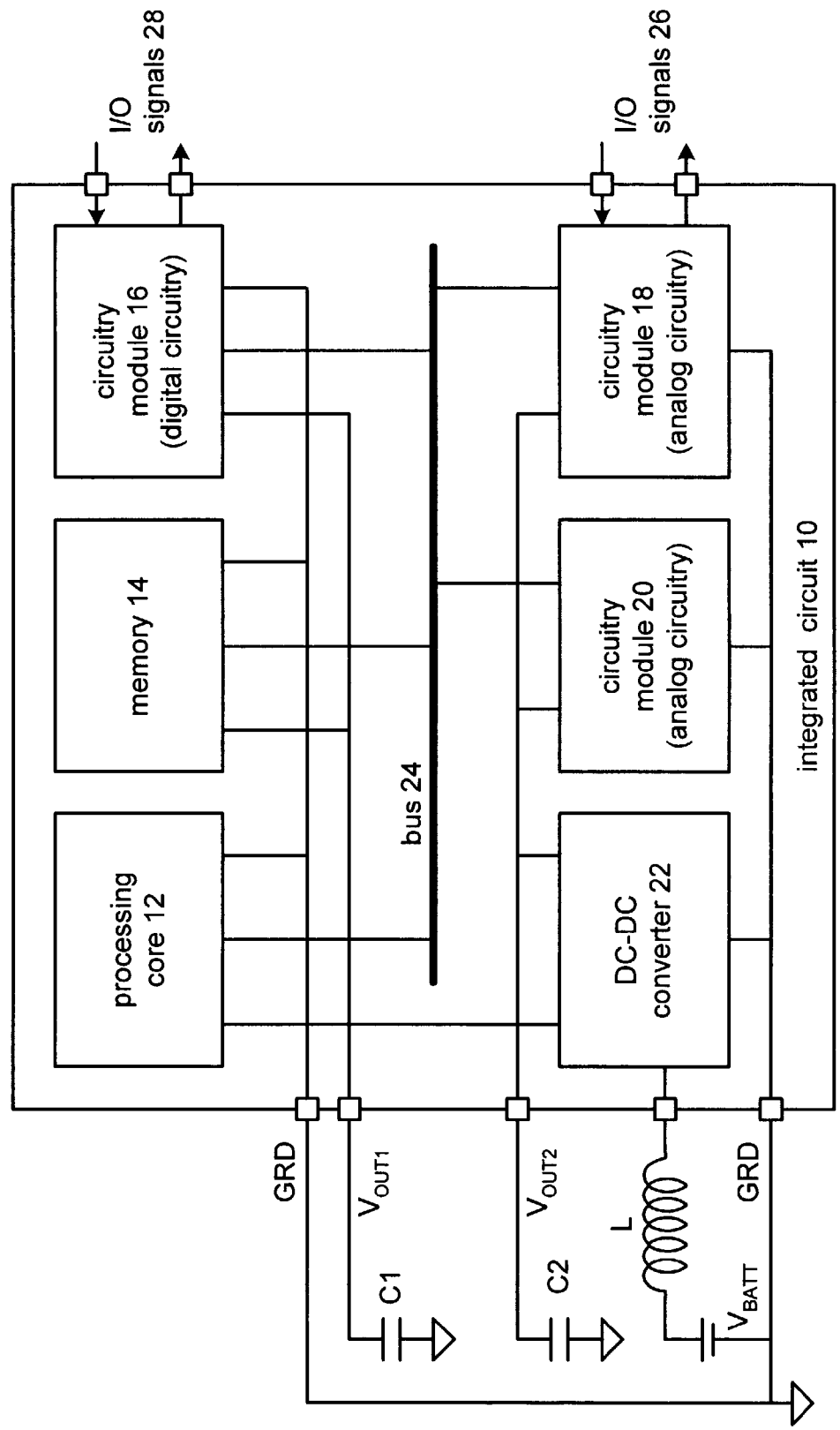
FIG. 3 illustrated a schematic block diagram of an integrated circuit in accordance with the present invention.

The present invention can be more fully described with reference to FIGS. 3–8. FIG. 3 illustrates an integrated circuit 10 that includes a processing core 12, memory 14, circuit module 16, which may be digital circuitry, circuit modules 18 and 20, which may be analog circuitry, a DC to DC converter 22 and a bus 24. External to the integrated circuit 10 is a battery ($V_{batt}$), an inductor (L), and two capacitors (C1 and C2). In general, the integrated circuit 10 may be any type of integrated circuit that benefits from an on-chip DC to DC converter 22 that produces multiple outputs from a single off-chip inductor. For instance, the integrated circuit 10 may correspond to an integrated MP3 device, telecommunication circuitry, et cetera.

The processing core 12 may be a microprocessor, microcontroller, digital signal processor, field programmable gate array or any other type of digital circuitry that processes signals based on operational instructions. The memory 14 may be read-only memory, random access memory, static memory and/or dynamic memory. The circuit module 16 may be logic circuitry, and/or any other type of digital processing circuitry. In this illustration, the circuit module 16, via pins of the integrated circuit 10 are operably coupled to receive digital input and/or output signals 28. Circuitry modules 18 and 20, which may be analog circuitries, may include any type of analog circuitry including clock circuitry, amplifiers, buffers, et cetera. The circuitry module 18 is operably coupled to receive input and/or output analog signals 26 via pins of the integrated circuit 10. As one of average skill in the art will appreciate, the integrated circuit 10 may include more or less components than illustrated in FIG. 3.

The DC to DC converter 22, which will be discussed in greater detail with reference to FIGS. 4–8, is operably coupled via pins of the integrated circuit to the inductor L, capacitors C1 and C2, and two ground pins (GRD). One ground pin is operably coupled internally to the processing core 12, memory 14 and circuitry module 16. As such, the $1^{st}$ ground is used as a digital ground. The $2^{nd}$ ground pin couples the DC to DC converter 22 and analog circuitry modules 18 and 20 to ground. External to the integrated circuit 10 the ground pins are operably coupled together. Such separate internal ground paths reduce the noise generated by the digital circuits on the analog reference potential.

In operation, the DC to DC converter 22 charges and discharges energy in the inductor via the battery and steers the energy either to capacitor C or capacitor C2 to produce regulated output voltages $V_{out1}$, and $V_{out2}$. Internally, $V_{out1}$, sources the processing core 12, memory 14 and circuitry module 16. $V_{out2}$ sources the analog circuitry modules 18 and 20. As one of average skill in the art will appreciate, the output voltages produced by the DC to DC converter may be used to source any one of the components in the integrated circuit or additional components not illustrated in FIG. 3. In addition, one of average skill in the art will appreciate that the DC to DC converter 22 may produce more than two output voltages as illustrated.

Figure 4:
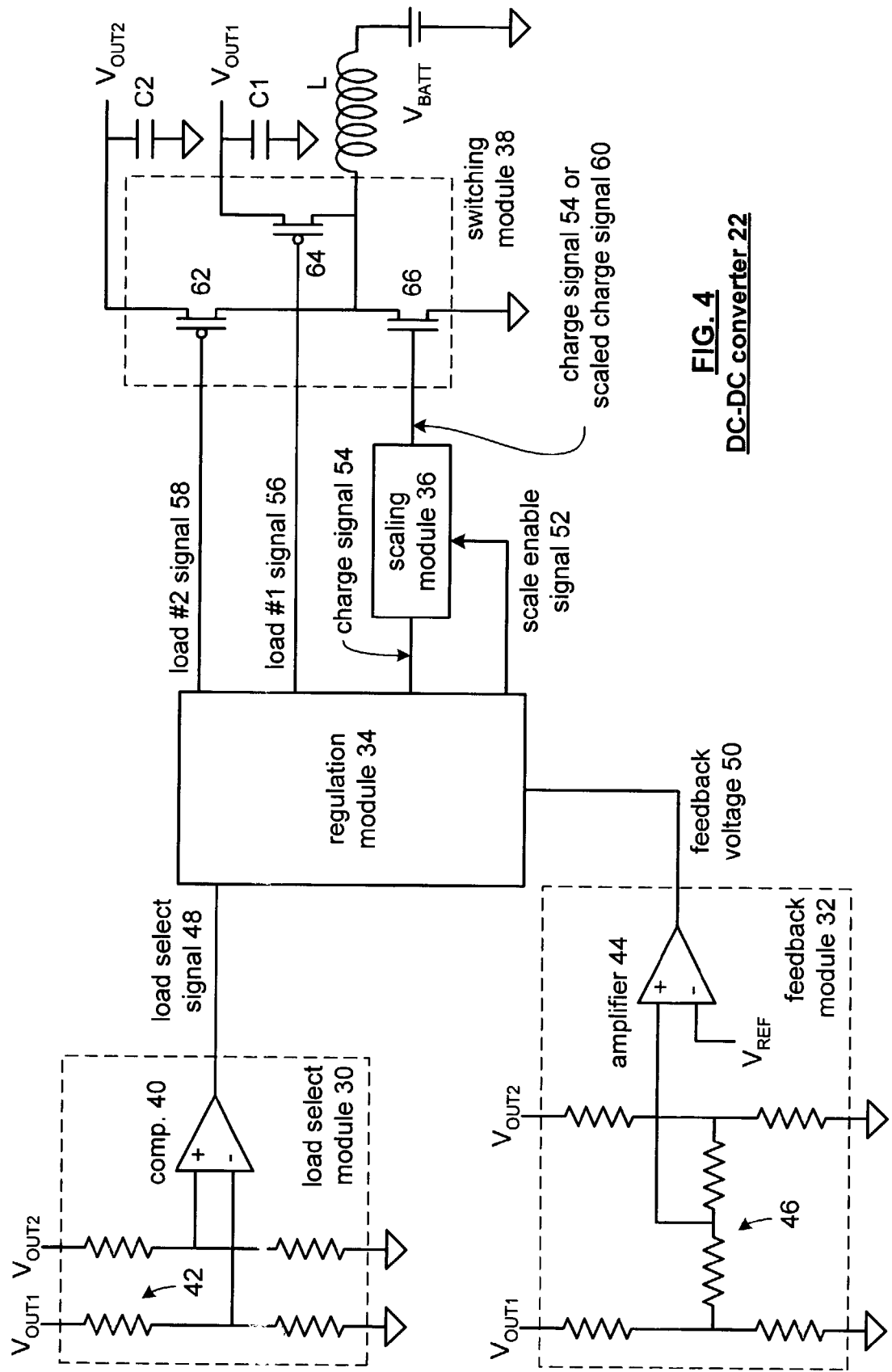
FIG. 4 illustrates a schematic block diagram of a DC to DC converter in accordance with the present invention.

FIG. 4 illustrates a schematic block diagram of the DC to DC converter 22 configured as a boost converter. The boost DC to DC converter 22 includes a load select module 30, a feedback module 32, a regulation module 34, a scaling module 36, and a switching module 38. The external components of the integrated circuit, i.e., the inductor the capacitors and the battery, are illustrated as well. The load select module 30 is operably coupled to the $1^{st}$ and $2^{nd}$ outputs $V_{out1}$, and $V_{out2}$ and produces therefrom a load select signal 48. The load select signal 48 indicates whether the $1^{st}$ load $V_{out1}$ or the second load $V_{out2}$ is to receive energy from the inductor during the next cycle or cycles. As shown, the load select module 30 includes a pair of resistive dividers 42 coupled to a comparator 40. As such, when the divider voltage for $V_{out1}$ is higher than the divider voltage for $V_{out2}$ the load select signal selects $V_{out2}$. Conversely, when the divider voltage for $V_{out2}$ is greater than the divider voltage for $V_{out1}$, the load select signal 48 indicates $V_{out1}$ is to receive the energy from the inductor.

The feedback module 32 generates a feedback voltage 50 based on the $1^{st}$ and $2^{nd}$ outputs. The feedback module 32 includes a resistor network 46 and an amplifier 44. The resistor network 46 provides a common mode representative voltage of the outputs to the amplifier 44. The amplifier 44 amplifies the common mode representative voltage of the outputs with respect to a reference voltage ($V_{ref}$) to produce the feedback voltage 50.

The regulation module 34, which is more fully described in issued U.S. Pat. No. 60,204,651 issued to May, et al on Mar. 20, 2001, receives the load select signal 48 and the feedback voltage 50. Based on these inputs, the regulation module 34 generates a charge signal 54 and activates either the load number 2 signal 58 or load number 1 signal 56. In addition, the regulation module 34 generates a scale enable signal 52. For example, if the directly regulated output in this example is $V_{out1}$, when the regulation module 34 receives the load select signal 48 for $V_{out1}$, the charge signal 54 is generated and the scale enable signal 52 is disabled. As such, the scaling module 36 will pass the charge signal 54 unaltered to the switching module 38. In addition, the regulation module 34 will activate the load # 1 signal 56, after the charge signal 54 is de-asserted, such that the energy of the inductor is passed to capacitor C1 to produce output voltage $V_{out1}$, via transistor 64 of switching module 38.

When the load select signal 48 indicates that the $2^{nd}$ output $V_{out2}$ is to receive energy from the inductor, the regulation module 34 regulates the charge signal 54 as if output 1 were to receive the energy. In addition, the regulation module 34 enables the scale enable signal 52. In response to the scale enable signal 52, the scaling module 36 scales the charge signal 54 to produce the scaled charge signal 60. The scaled charge signal 60 activates transistor 66 to sink energy into the inductor from the battery during the scaled charge interval. At the de-assertion of the scaled charge signal 60, load # 2 signal 58 is activated such that energy is transferred to capacitor C2 via transistor 62 to produce the $2^{nd}$ output voltage $V_{out2}$.

The magnitude by which the scaling module 36 scales the charge signal 54 is dependent on a ratio between the charge time duty cycle of the $1^{st}$ and $2^{nd}$ outputs. In a steady state condition for a boost converter, the duty cycle for output 1 (e.g., the ratio of the on-time for charge signal versus the period between charge signals) corresponds to the $1^{st}$ output voltage less the battery voltage, divided by the $1^{st}$ output, i.e., $(V_{out1-Vbatt})/V_{out1}$. Similarly, the duty cycle for the $2^{nd}$ output is the $2^{nd}$ output minus the battery voltage or supply voltage divided by the $2^{nd}$ output, i.e., $(V_{out2}-V_{batt})/V_{out2}$. For example, if the battery voltage is 1.5 volts, the $1^{st}$ output is 1.8 volts and the $2^{nd}$ output is 3.3 volts, the duty cycle for the $1^{st}$ output is approximately 17% while the duty cycle for the $2^{nd}$ output is approximately 45%. As such, when the scaling module 36 is active for this example, the scales module 36 scales the 17% duty cycle signal for the first output to produce a 45% duty cycle charge signal.

Figure 5:
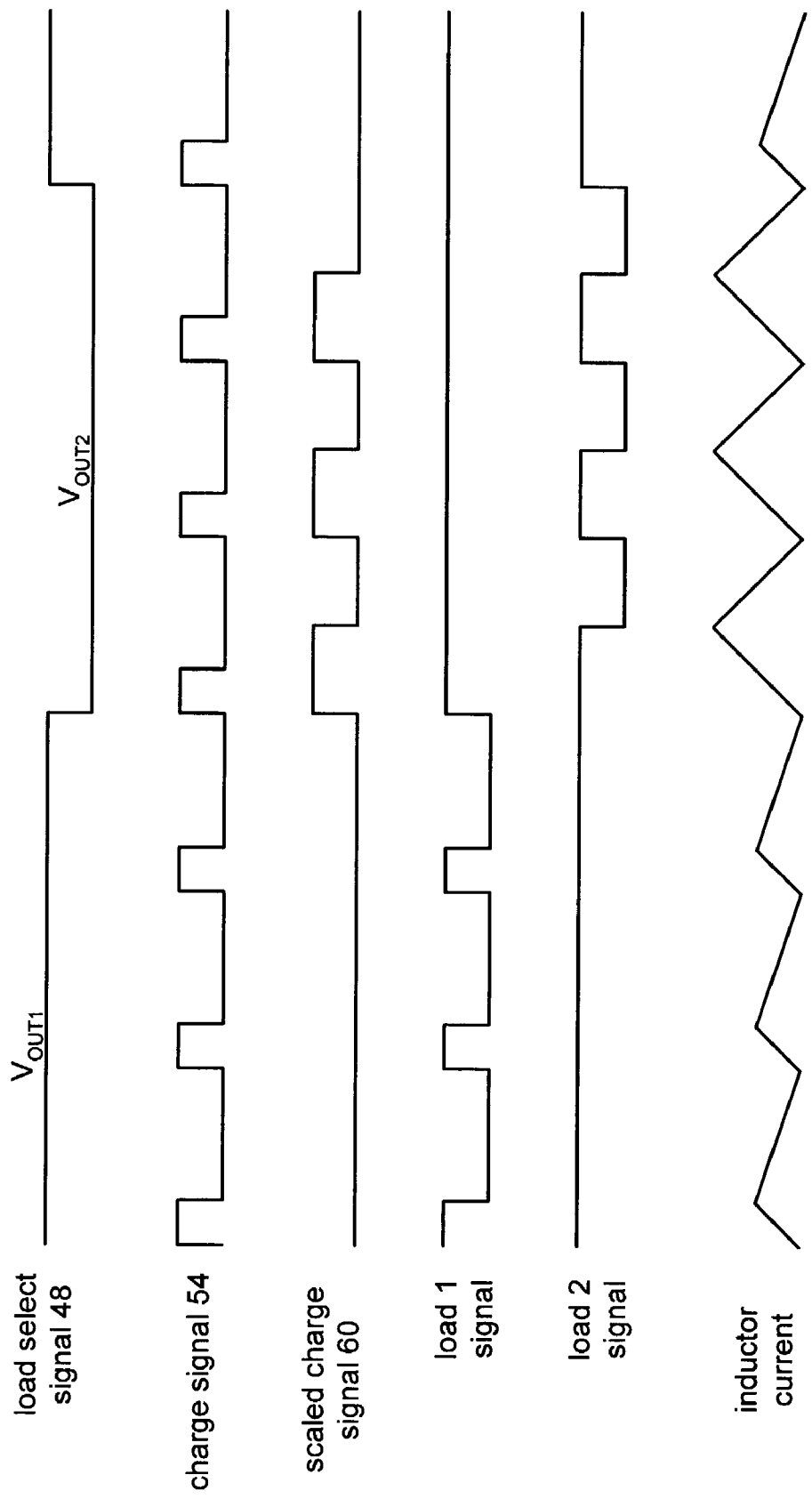
FIG. 5 illustrates a waveform diagram corresponding to the operation of the DC to DC converter of FIG. 4.

The results of scaling the charge signal 54 are illustrated in FIG. 5. As shown, the load select signal 48 is initially high. As such, the first output will receive energy from the inductor, which is charged based on the charge signal 54. For this example, the charge signal 54 is produced based on regulating the first output at its desired output voltage. Also for this example, the first output is the primary output and, as such, the scale enable signal 52 is inactive. With the scale enable signal 52 inactive, the scaling module 36 passes the charge signal 54 without scaling. Load signal #1 is active to direct the energy to capacitor C1, maintaining the first output voltage $V_{out1}$. During this state of the load select signal 48, the inductor is charged based on the charge signal 54 and discharged into capacitor C1 when load signal #1 is active producing the current waveform as shown.

When the load select signal 48 transitions from high to low, indicating that the $2^{nd}$ output $V_{out2}$ is to receive the energy from the inductor, the scale enable signal 52 (not shown in FIG. 5) is activated. With the scale enable signal 52 active, the scaling module 36 scales the charge signal 54 based on a ratio between the duty cycles of the first and second outputs to produce the scaled charge signal 60. For example, if the first output has a 17% duty cycle and the second output has a 45% duty cycle, the scaling module 36 will scale the charge signal 54 by $45/17^{th}$ to produce the scaled charge signal. As one of average skill in the art will appreciate, the scaling may be done using a delay module, counter, logic circuitry, etc.

With second output receiving the energy from the inductor, load signal #1 is inactive and load signal #2 is active. As such, the inductor is charged based on the scaled charge signal 60 and discharged into capacitor C2 of the second output producing the current waveform as shown. Since the change from charging the inductor from the charge signal 54 to charging it based on scaled charge signal 60 occurs in successive regulation cycles, the droop in current (as shown in FIG. 2) is avoided, thus substantially reducing the unwanted output rippled caused by the current droop.

As is further shown in FIG. 5, when the load select signal 48 transitions high again, the first output is to receive the energy from the inductor. When this transition occurs, the scale enable signal 52 is inactivated and, as such, the scaling module 36 passes the charge signal 54 without scaling it. Further, load signal #1 is again active to direct the energy to capacitor C1, maintaining the first output voltage $V_{out1}$. Still further, the inductor is again charged based on the charge signal 54 and discharged into capacitor C1 when load signal #1 is active producing the current waveform as shown. Again, since the change from charging the inductor from the scaled charge signal 60 to charging it based on charge signal 54 occurs in successive regulation cycles, the overshoot in current (the compliment of the current droop shown in FIG. 2) is avoided, thus substantially reducing the unwanted output rippled caused by the current overshoot.

Figure 6:
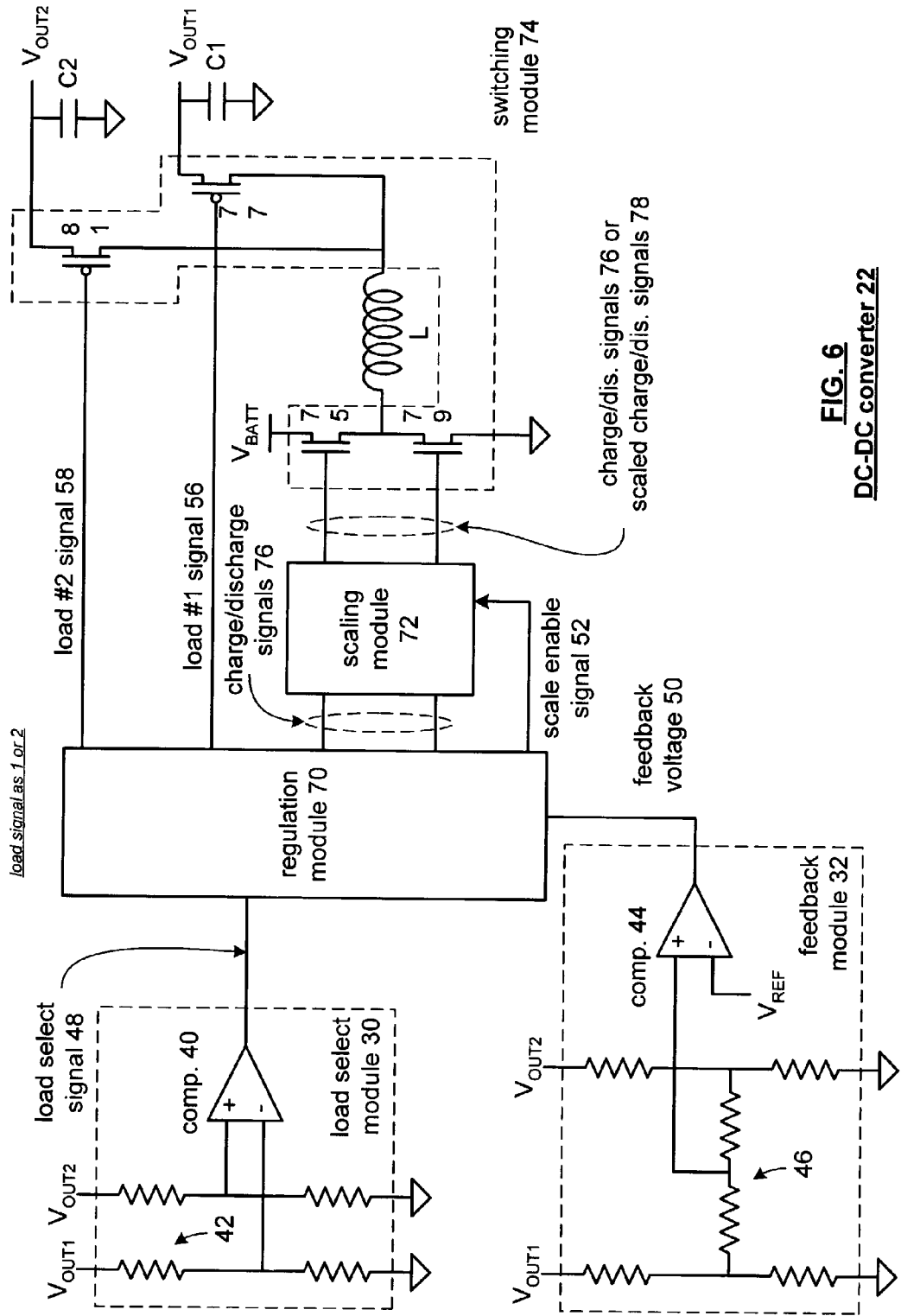
FIG. 6 illustrates a schematic block diagram of an alternate DC to DC converter in accordance with the present invention.

FIG. 6 illustrates a schematic block diagram of a buck DC to DC converter 22. The buck DC to DC converter 22 includes the load select module 30, the feedback module 32, regulation module 70, scaling module 72 and switching module 74. The switching module 74 is coupled to the external inductor L, external capacitors C1 and C2, and the external battery $V_{batt}$ to provide a buck converter. The functionality of the load select module 30 and the feedback module 32 operate as previously described. The regulation module 70 produces a charge/discharge signal 76, a scale enable signal 52, and the $1^{st}$ or $2^{nd}$ load signals 56 and 58 based on the load select signal 48 and the feedback voltage 50. If the primary output voltage $V_{out1}$ is the directly regulated output, when the load select signal 48 indicates that load 1 is to receive the energy, the scale enable signal 52 is inactive such that the sealing module 72 does not scale the charge/discharge signal 76.

The switching module 74 receives the charge/discharge signal 76 such that during a charge portion of the charge/discharge signal 76 transistor 75 is activated based on the charge/discharge signal 76 and transistor 77 is activated based on the load number 1 signal 56. With this coupling, the inductor L is charged from $V_{batt}$ to the output voltage $V_1$. During the discharge portion of the charge/discharge signal 76, transistor 79 is active and transistor 77 remains active such that the inductor is discharged.

If the $2^{nd}$ load is selected via load select signal 48, the regulation module 70 generates the charge/discharge signal 76 and also activates the scale enable signal 52 and the load number 2 signal 58. As such, the scaling module 72 scales the charge/discharge signal 76 to produce a scale charge/discharge signal 78. Accordingly, the inductor will be charged via transistors 75 and 81 of switching module 74 during the charge portion of the scaled charge/discharge signal 78. During the discharge portion of the scaled charge/discharge signal 78, the energy of the inductor will be discharged via transistors 81 and 79.

As one of average skill in the art will appreciate, the scaling module 72 and/or 36 may be implemented in a variety of ways to produce the scaled charge and/or scaled charge/discharge signals. For instance, a delay module may be used to delay the charge/discharge signal or charge signal, a one-shot device and a multiplexor may be used to select between the scaled signal and the non-scaled signal, et cetera. Further, in one embodiment, the charge/discharge signal 76 may be a digital value that represents the duty cycle for regulating the first output. The scaled charge/discharge signal 78 may be produced by adding a digital duty cycle offset value to the charge/discharge signal 76, by multiplying a digital duty cycle offset value with the charge/discharge signal 76, or by performing some other mathematical function on the charge/discharge signal 76. The resulting digital scaled charge/discharge signal 78 is converted into a time domain waveform for driving the transistors of the switching module.

Figure 7:
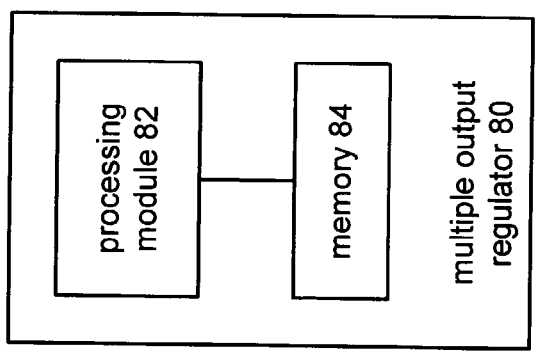
FIG. 7 illustrates a schematic block diagram of a multiple output regulator in accordance with the present invention.

FIG. 7 illustrates a schematic block diagram of a multiple output regulator 80 that may be incorporated in the DC to DC converter 22. The multiple output regulator 80 includes a processing module 82 and memory 84. The processing module 82 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 84 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 82 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 84 stores, and the processing module 82 executes, operational instructions corresponding to at least some of the steps and/or functions illustrated in FIG. 8.

Figure 8:
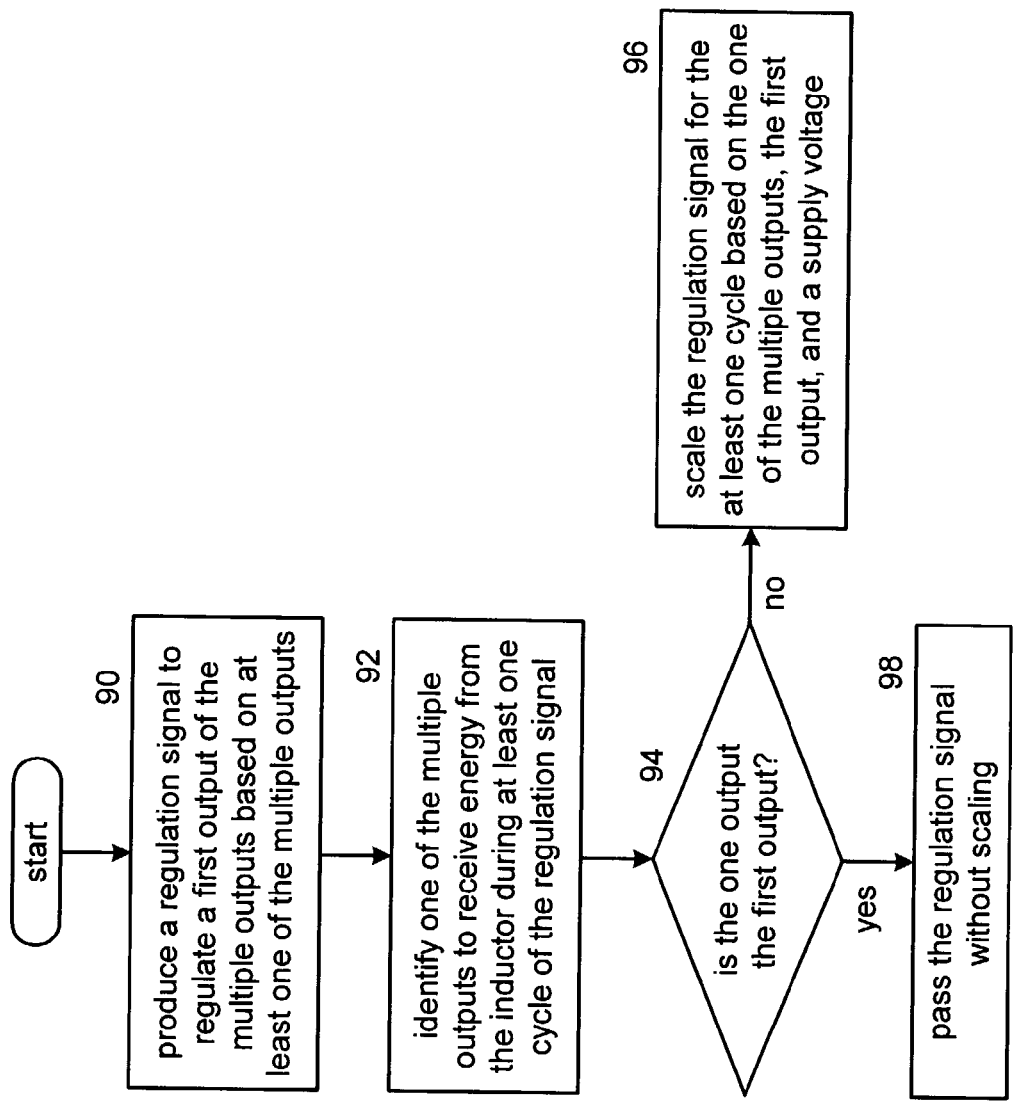
FIG. 8 illustrates a logic diagram of a method for regulating multiple outputs of a single inductor DC to DC converter in accordance with the present invention.

FIG. 8 illustrates a logic diagram of a method for regulating multiple outputs from a single inductor DC to DC converter. The process begins at Step 90 where a regulation signal is produced to regulate a $1^{st}$ output of the multiple outputs based on at least one of the multiple outputs. The process then proceeds to Step 92 where one of the multiple outputs to receive energy from the inductor during at least one cycle of the regulation signal is identified. This was graphically illustrated and discussed with reference to FIGS. 3–6.

The process then proceeds to Step 94 where a determination is made as to whether the output that is to receive the energy is the $1^{st}$ output (i.e., the output that is directly regulated). If so, the process proceeds to Step 98 where the regulation signal is passed without scaling.

If, however, the particular output to receive the energy is not the $1^{st}$ output, the process proceeds to Step 96. At Step 96, the regulation signal is scaled for at least one cycle based on the output voltage of the particular output, the $1^{st}$ output and a supply voltage. Accordingly, the scaling is done based on the difference in duty cycles of the steady state condition of the $1^{st}$ output and the particular output. Note that the at least one cycle corresponds to one cycle of generating the charge signal. Typically, a particular output will be receiving energy from the inductor for multiple cycles.

The preceding discussion has presented a method and apparatus for regulating multiple outputs from a single inductor DC to DC converter that minimizes output voltage ripple. The single inductor DC to DC converter may have a buck topology, a boost topology, a buck/boost topology, half bridge topology, full bridge topology, or any other type of topology to produce multiple outputs from a single inductor. Further, the single inductor DC to DC converter may be a voltage mode converter or a current mode converter. As one of average skill in the art will appreciate, other embodiments may be derived from the teaching of the present invention, without deviating from the scope of the claims.

What is claimed is:

1. A method for regulating multiple outputs of a single inductor DC to DC converter, the method comprises:
   producing a regulation signal to regulate a first output of the multiple outputs based on at least one of the multiple outputs;
   identifying one of the multiple outputs to receive energy from the inductor during at least one cycle of the regulation signal;
   calculating a calculated duty cycle by dividing a difference between the one of the multiple outputs and the supply voltage by the one of the multiple outputs; and
   when the one of the multiple outputs to receive the energy is not the first output, scaling the regulation signal for the at least one cycle based on a scaling factor computed as a ratio between duty cycle of the regulation signal for the first output and the calculated duty cycle.

2. The method of claim 1 further comprises:
   when the one of the multiple outputs to receive the energy is the first output, passing the regulation signal without scaling.

3. The method of claim 1, wherein the scaling the regulation signal further comprises:
   computing a second scaling factor for a second one of the multiple outputs based on the second one of the multiple outputs, the first output, and the supply voltage.

4. The method of claim 1, wherein the identifying the one of the multiple outputs further comprises:
   sensing a representative voltage for each of the multiple outputs to produce a plurality of sensed representative voltages; and
   comparing the plurality of sensed representative voltages to determine a least favorable comparison; and
   identifying the one of the multiple outputs as the one of the multiple outputs that corresponds to the least favorable comparison.

5. An integrated circuit DC-DC converter comprises:
   load select module operably coupled to produce a load select signal based on multiple outputs of the integrated circuit DC-DC converter;
   feedback module operably coupled to produce a feedback voltage based on the multiple outputs;

regulation module operably coupled to generate a charge signal, a load signal, and a scale enable signal based on the load select signal and the feedback voltage;

scaling module operably coupled to scale the charge signal when the scale enable signal is in a first state to produce a scaled charge signal and to pass the charge signal when the scale enable signal is in a second state, to calculate a calculated duty cycle by dividing a difference between the one of the multiple outputs and the supply voltage by the one of the multiple outputs, to compute a scaling factor as a ratio between duty cycle of the charge signal for the first output and the calculated duty cycle, and to scale the charge signal based on the scaling factor; and switching module operably coupled to single off-chip inductor, to a first off-chip load, to a second off-chip load, and to a supply voltage, wherein the switching module provides coupling between the single off-chip inductor, the first off-chip load, the second off-chip load, and the supply voltage to produce the multiple outputs.

6. The integrated circuit DC-DC converter of claim 5 further comprises:

the regulation module to generate the charge signal, the load signal, and the scale enable signal such that the switching module provides coupling between the single off-chip inductor, the first off-chip load, the second off-chip load, and the supply voltage to produce the boost-mode multiple outputs and the multiple outputs.

7. The integrated circuit DC-DC converter of claim 5 further comprises:

the regulation module to generate the charge signal, the load signal, and the scale enable signal such that the switching module provides coupling between the single off-chip inductor, the first off-chip load, the second off-chip load, and the supply voltage to produce the buck-mode multiple outputs and the multiple outputs.

8. The integrated circuit DC-DC converter of claim 5 further comprises:

the regulation module operably coupled to:
produce the charge signal to regulate a first output of the multiple outputs from the feedback voltage;
identify one of the multiple outputs to receive energy from the off-chip inductor when the load signal is enabled based on the load select signal; and
when the one of the multiple outputs to receive the energy is not the first output, generate the scale enable signal to be in the first state.

9. The integrated circuit DC-DC converter of claim 5 further comprises:

the regulation module operably coupled to:
when the one of the multiple outputs to receive the energy is the first output, generate the scale enable signal to be in the second state.

10. The integrated circuit DC-DC converter of claim 5 further comprises:

the switching module operably coupled to a third off-chip load to produce a third output of the multiple outputs; and
the scaling module operably coupled to scale the charge signal based a second scaling factor when the scale enable signal is in a third state.

11. An apparatus for regulating multiple outputs from a single inductor DC to DC converter, the apparatus comprises:

a processing module; and
memory operably coupled to the processing module, wherein the memory stores operational instructions that cause the processing module to:
produce a regulation signal to regulate a first output of the multiple outputs based on at least one of the multiple outputs;
identify one of the multiple outputs to receive energy from the inductor during at least one cycle of the regulation signal; and
calculating a calculated duty cycle by dividing a difference between the one of the multiple outputs and the supply voltage by the one of the multiple outputs; and
when the one of the multiple outputs to receive the energy is not the first output, scaling the regulation signal for the at least one cycle based on a scaling factor computed as a ratio between duty cycle of the regulation signal for the first output and the calculated duty cycle.

12. The apparatus of claim 11, wherein the memory further comprises operational instructions that cause the processing module to:

when the one of the multiple outputs to receive the energy is the first output, pass the regulation signal without scaling.

13. The apparatus of claim 11, wherein the memory further comprises operational instructions that cause the processing module to scale the regulation signal by:

computing a second scaling factor for a second one of the multiple outputs based on the second one of the multiple outputs, the first output, and the supply voltage.

14. The apparatus of claim 11, wherein the memory further comprises operational instructions that cause the processing module to identify the one of the multiple outputs by:

sensing a representative voltage for each of the multiple outputs to produce a plurality of sensed representative voltages; and
comparing the plurality of sensed representative voltages to determine a least favorable comparison; and
identifying the one of the multiple outputs as the one of the multiple outputs that corresponds to the least favorable comparison.

15. An integrated circuit comprises:

processing core;
memory operably coupled to the processing core, wherein the memory stores algorithms executed by the processing core;
circuitry module operable to process input signals and output signals; and
DC-DC converter operably coupled to supply voltages to the processing core, the memory and the circuitry module, wherein the DC-DC converter includes:
load select module operably coupled to produce a load select signal based on multiple outputs of the integrated circuit DC-DC converter;
feedback module operably coupled to produce a feedback voltage based on the multiple outputs;
regulation module operably coupled to generate a charge signal, a load signal, and a scale enable signal based on the load select signal and the feedback voltage;
scaling module operably coupled to scale the charge signal when the scale enable signal is in a first state to produce a scaled charge signal and to pass the charge signal when the scale enable signal is in a second state, to calculate a calculated duty cycle by dividing a difference between the one of the multiple outputs and the supply voltage by the one of the multiple outputs, to compute a scaling factor as a ratio between duty cycle of the charge signal for the first output and the calculated duty cycle, and to scale the charge signal based on the scaling factor; and switching module operably coupled to single off-chip inductor, to a first off-chip load, to a second off-chip load, and to a supply voltage, wherein the switching module provides coupling between the single off-chip inductor, the first off-chip load, the second off-chip load, and the supply voltage to produce the multiple outputs.

16. The integrated circuit of claim 15 further comprises:
the regulation module to generate the charge signal, the load signal, and the scale enable signal such that the switching module provides coupling between the single off-chip inductor, the first off-chip load, the second off-chip load, and the supply voltage to produce the boost-mode multiple outputs and the multiple outputs.

17. The integrated circuit of claim 15 further comprises:
the regulation module to generate the charge signal, the load signal, and the scale enable signal such that the switching module provides coupling between the single off-chip inductor, the first off-chip load, the second off-chip load, and the supply voltage to produce the buck-mode multiple outputs and the multiple outputs.

18. The integrated circuit of claim 15 further comprises:
the regulation module operably coupled to:
produce the charge signal to regulate a first output of the multiple outputs from the feedback voltage;
identify one of the multiple outputs to receive energy from the off-chip inductor when the load signal is enabled based on the load select signal; and
when the one of the multiple outputs to receive the energy is not the first output, generate the scale enable signal to be in the first state.

19. The integrated circuit of claim 15 further comprises:
the regulation module operably coupled to:
when the one of the multiple outputs to receive the energy is the first output, generate the scale enable signal to be in the second state.

20. The integrated circuit of claim 15 further comprises:
the switching module operably coupled to a third off-chip load to produce a third output of the multiple outputs; and
the scaling module operably coupled to scale the charge signal based a second scaling factor when the scale enable signal is in a third state.

* * * * *